J. A. WADE.
VARIABLE SPEED FRICTION GEARING.
APPLICATION FILED MAY 26, 1913.

1,098,771.

Patented June 2, 1914.
6 SHEETS—SHEET 1.

J. A. WADE.
VARIABLE SPEED FRICTION GEARING.
APPLICATION FILED MAY 26, 1913.

1,098,771.

Patented June 2, 1914.
6 SHEETS—SHEET 4.

Witnesses:
M. B. Maus.
W. Wallace Nairn Jr.

Joseph A. Wade, Inventor
By Sowell & Sowell, Attys

J. A. WADE.
VARIABLE SPEED FRICTION GEARING.
APPLICATION FILED MAY 26, 1913.

1,098,771.

Patented June 2, 1914.
6 SHEETS—SHEET 6.

UNITED STATES PATENT OFFICE.

JOSEPH ARTHUR WADE, OF LIVERPOOL, ENGLAND.

VARIABLE-SPEED FRICTION-GEARING.

1,098,771.  Specification of Letters Patent.  Patented June 2, 1914.

Application filed May 26, 1913. Serial No. 769,951.

*To all whom it may concern:*

Be it known that I, JOSEPH ARTHUR WADE, a subject of the King of Great Britain and Ireland, residing at Stoneycroft, Liverpool, England, have invented Improvements in Variable-Speed Friction-Gearing, of which the following is a specification.

This invention relates to frictional contact driving gearing wherein a wheel and its shaft are movable laterally with a parallel motion in a direction at right angles to its axis of rotation, toward a disk on a shaft at right angles to such axis and yieldingly held in engagement with such disk, speed variation being attained by altering the position or radius at which the friction wheel engages the disk. Various arrangements of this general character have been proposed where the disk is the driving member and consequently has the motor or driving means associated with it but being designed for particular purposes they have involved elements requiring to be supported from or incorporated in the framing carrying the disk and associated driving means.

Now this invention provides a self contained arrangement of the type referred to, that is one wherein the laterally movable friction wheel shaft constitutes the driving shaft and is mounted with the gearing for axially altering the position of the wheel along its shaft upon a rocking base thus forming a unit which together with adjustable bearings for the base, enables it to be applied to existing machinery, such as a doubling machine for cotton spinning, having a disk to be driven. The resultant speed may be constantly varying or may be constant for a period and, for another period, increased or diminished automatically to suit the requirements of the machine the driving gearing is applied to.

In the drawings the gearing is shown applied to a doubling frame for cotting spinning, only a portion of the machine being shown.

Fig. 2 is a plan, Fig. 3 an end elevation and Fig. 4 a similar view to Fig. 3 but partly in section. Figs. 5 to 11 are detail views of one form of automatic speed varying gearing. Fig. 10$^a$ illustrates an adjustable spring arrangement and means for tilting the bed. Fig. 10$^b$ illustrates a modification, and Fig. 10$^c$ is a detail view.

In Figs. 1 to 11 a rocking base plate $a$ is provided with bearings $a^1$ mounted freely upon a longitudinal pivot shaft $b$ supported in adjustable bearings $b^1$ secured to the floor stands $b^2$ which will admit of the base plate being regulated to the desired height. At one end of the plate $a$ an electrically driven motor $c$ is provided, its shaft $c^1$ having an extension $c^2$ coupled thereto supported in suitable ball bearings provided in two standards $d$ and $e$ which are rigidly fixed to base plate $a$. These standards have upwardly extending arms $d^1$, $e^1$ to whose ends springs $d^2$ are connected, winged nuts or the like being provided to enable the tension of the springs to be adjusted. The other ends of the springs may be connected with the end frame $f$ of the machine to be variably driven.

Figure 4:
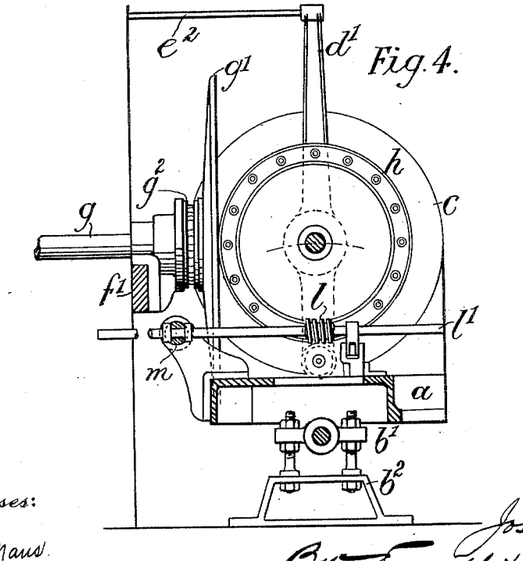
Figures 10, 10A, 11:
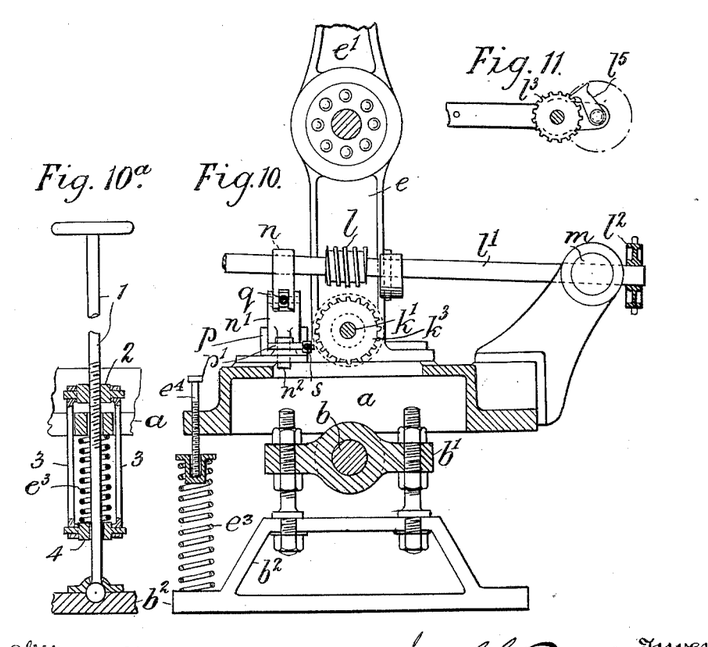
Figure 10:
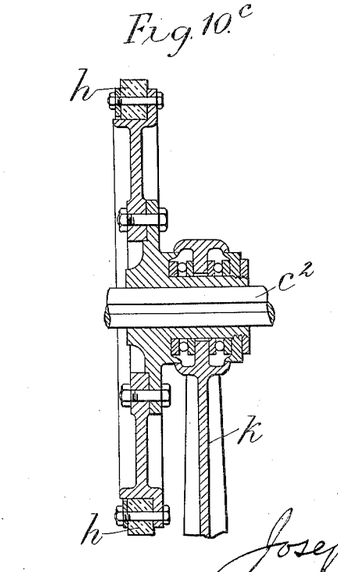
Figure 10B:
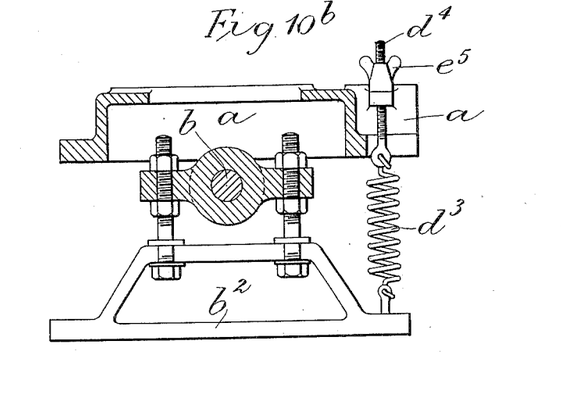

Sometimes only one standard is employed and the spring or springs in either case may be replaced by flexible rubber rope $e^2$ or equivalent, Fig. 4. Or a compression spring or springs $e^3$ may be placed between the base plate $a$ and the feet of the stands $b^2$ a regulating screw $e^4$ being provided as shown on the left side of Fig. 10. Or a tension spring $d^3$ as shown in Fig. 10$^b$ may be employed, the pressure being regulated by a winged nut $e^5$ on the rod $d^4$. These arrangements have for object to cant the base plate $a$ and its attached parts toward the face of a rotary disk $g^1$ fixed to the end of the shaft $g$ to be driven and which is supported in a thrust ball bearing $g^2$ bolted to a cross member $f^1$ on the machine frame $f$.

Sufficient distance obtains between the standards for a friction driving wheel $h$ upon the shaft $c^2$ to move across part of the face of the disk $g^1$ to produce the variable speeds desired. The driving wheel $h$ has a renewable rim of leather or other suitable material for frictional rolling driving contact when pressed on to the driven disk by the springs. The boss of the wheel $h$ has ball thrust bearings associated with one end of a traversing arm $k$ whose other end can slide longitudinally along the shaft $b$, see Fig. 10$^c$.

Figures 6, 8:
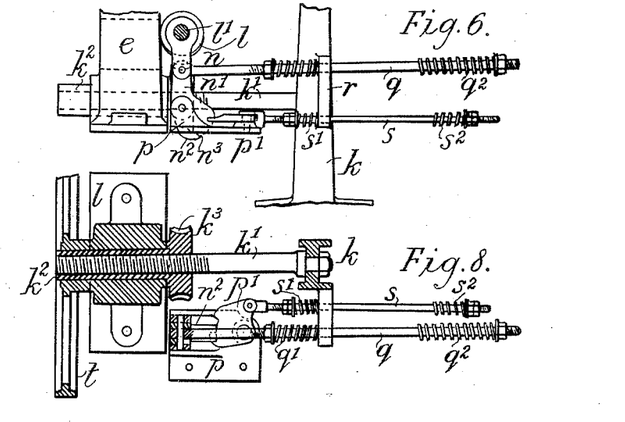
Figure 9:
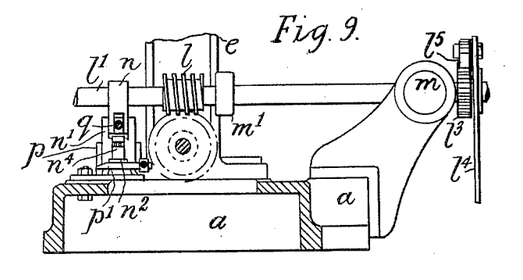

The arm $k$ may be actuated in any convenient manner according to conditions, such as by a screw threaded spindle $k^1$ fixed thereto and passing through a rotatable nut $k^2$ in the standard $e$, (Fig. 8). The nut $k^2$ may, as required, be stopped after a predetermined number of revolutions have been given to the machine by suitable tappet mechanism and then the driving wheel $h$ may be traversed along its driving shaft $c^2$ in the opposite direction by hand or frictional gearing as hereinafter described.

Figure 3:
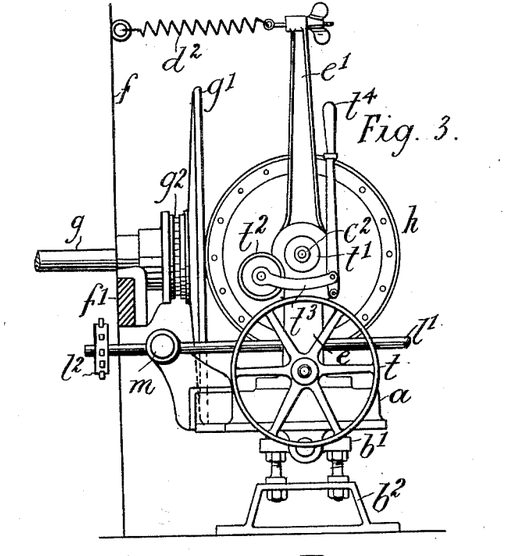

In the arrangement illustrated the nut $k^2$ has a worm wheel $k^3$ and is slowly rotated in one direction only by engaging at certain times with a worm $l$ on a shaft $l^1$ rotated from a slowly rotating shaft (not shown) of the machine to which the variable speed gearing is applied, as for example by a chain wheel $l^2$ (Figs. 3 and 10). This gearing may be modified to suit the machine. For instance, where the time between the greatest and least speed required is considerable, the worm shaft $l^1$ may have a toothed rachet wheel $l^3$ the drive being effected by a rocking arm $l^4$ through a pawl $l^5$ whose position can be altered to turn the worm shaft in either direction, see Figs. 1, 2, 9 and 11. The rocking arm $l^4$ may be actuated by a rod $l^{10}$ connected with an eccentric $l^6$ on a short shaft $l^7$ rotated by a belt or chain $l^8$ from a shaft $l^9$ of the machine.

Figure 1:
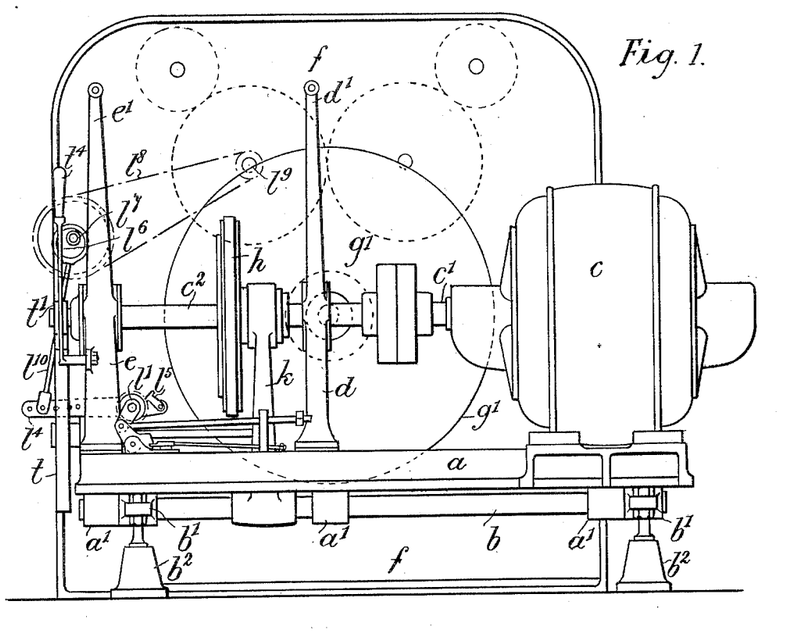
Figure 1 is an end elevation with the machine frame in outline; the electrically driven friction driving wheel being in position to give a speed equal to that of the motor.
Figure 2:
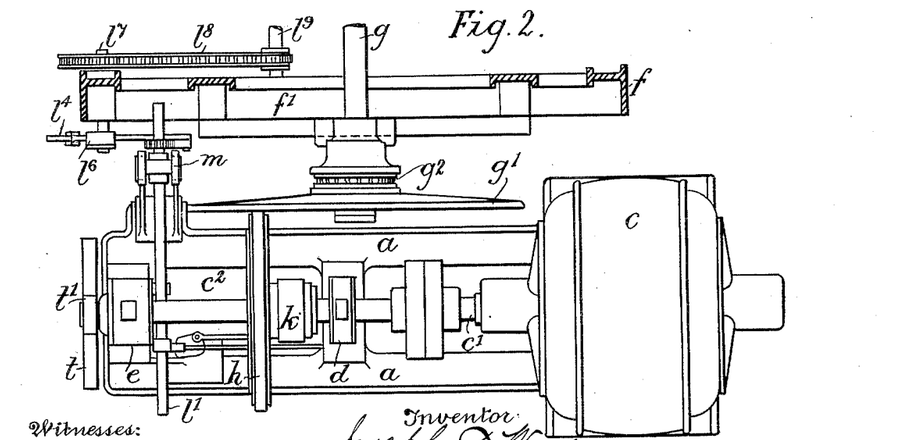
Figures 5, 7:
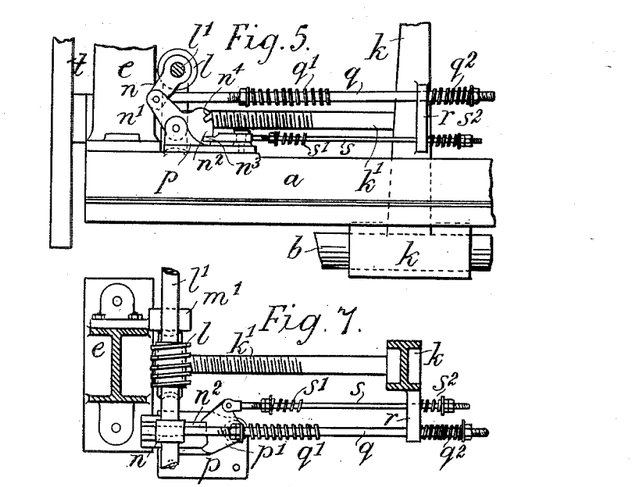

One end of the worm shaft $l^1$ rotates in a swivel bearing $m$ which permits of the shaft $l^1$ being slightly raised and lowered, $m^1$ being a lateral guide. The other end of the shaft $l^1$ works freely in the end of a lever $n$ which forms one arm of a toggle lifting appliance the other arm $n^1$ being pivoted to a bracket $p$ located directly below the center of the worm shaft $l^1$. The lever $n^1$ has an arm $n^2$ with a radial face having suitable retaining notches $n^3$ and $n^4$, (Figs. 5 and 6). The toggle levers are jointed by a pin which carries an actuating rod $q$ that slides through a lug $r$ on the arm $k$ and is provided with compression springs $q^1$, $q^2$ and regulating nuts. To the bracket $p$ is pivoted a locking plate $p^1$, so movable that at certain times it will engage with say the notch $n^3$ and thus retain the worm shaft $l^1$ in driving gear with the nut $k^2$ (Figs. 1 and 5). When the toggle levers are moved into the position shown in Fig. 6 the worm is out of engagement with nut $k^2$ and locking plate $p^1$ is in engagement with the notch $n^4$.

The locking plate $p^1$ is actuated by a rod $s$ pivoted as shown in Figs. 7 and 8 and guided through the lug $r$. The rod $s$ has springs $s^1$ and $s^2$ and adjusting nuts, the whole arrangement being such that before the traversing arm $k$ reaches its full determined travel, it will have compressed the spring $q^1$ or the spring $q^2$ on the rod $q$ so that the power thus stored is sufficient to open or close the toggle joint when the locking plate $p^1$ releases same. Simultaneously with the compression of the springs $q^1$ or $q^2$ and during the last portion of the stroke, one or other of the shorter springs $s^1$ $s^2$ which have only a small range of compression will be also compressed sufficiently to move the locking plate from engagement with the notch $n^3$ or $n^4$. Directly the toggle is released the compressed spring $q^1$ or $q^2$ will move the toggle from the position shown in Fig. 5 to that shown in Fig. 6 or vice versa. The spring $s^2$ after releasing the arm $n^2$ will again force the other side of the locking plate into engagement with the other notch and thus retain the toggle lever in the new position until the traversing arm has moved in the reverse direction over to the full extent determined when the toggle levers will return to the first position. The reverse direction of travel of the driving wheel $h$ along the face of the driven disk $g^1$ may be made automatic in action when desired.

In the arrangement under notice a friction wheel $t$ which may consist of a hand wheel is secured to the outer end of nut $k^2$ for rotating it, and on the end of the shaft $c^2$ a smaller wheel $t^1$ is provided while between but normally free of the peripheries of the two wheels is an idle friction wheel $t^2$ Fig. 3, carried on links $t^3$ connected to a hand lever $t^4$ pivoted to the standard $e$. The arrangement is such that when the toggle is in the position in which the worm $l$ is raised out of engagement with the nut $k^2$, the hand lever $t^4$ can be actuated to bring the wheel $t^2$ into engagement with the wheels $t^1$ and $t$ thus transmitting motion from the shaft $c^2$ to the nut $k^2$ in the opposite direction to that produced by the worm shaft, until the toggle is released and the worm engages with the worm wheel. To move the driving wheel $h$ into position without employing the said automatic gearing the wheel $t$ may be operated by hand.

Figure 12:
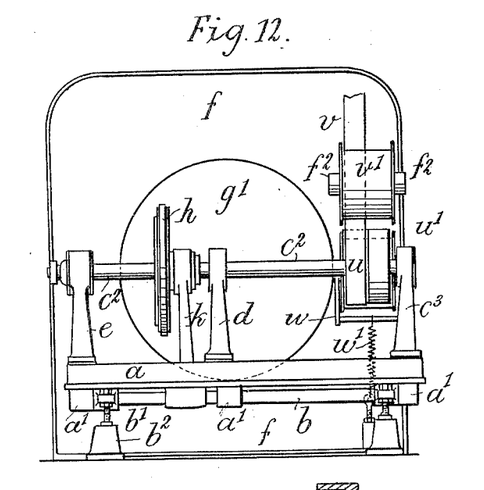
Figs. 12 and 13 show the gearing as being driven by a belt.
Figure 13:
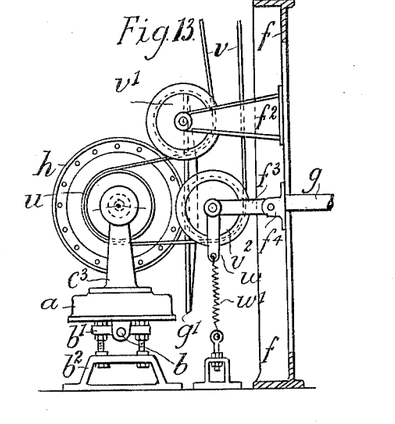

In Figs. 12 and 13 the gearing for traversing the driving wheel $h$ is omitted for the sake of clearness. The outer end of the shaft $c^2$ is supported on a standard $e^3$ secured to the rocking base plate $a$. Instead of rotating the shaft $c^2$ by an electrical or other motor fitted on to the rocking base plate $a$, fast and loose belt driving pulleys $u$ and $u^1$ are provided; the driving belt $v$ may either drive direct or be guided by pulleys $v^1$ $v^2$ so as to utilize the drag on the driving belt for canting the rocking base plate $a$ and pressing the driving pulley $h$ into frictional contact with the friction disk $g^1$. Thus when starting the apparatus the greatest amount of pressure will be applied through the pull of the guided belt and the pressure will somewhat diminish as the speed increases to its full extent. The upper guide pulley $v^1$ is carried by a bracket $f^2$ secured to the frame $f$ while the lower pulley $v^2$ may be held in position by a link $f^3$ hinged to a bracket $f^4$ (Fig. 13). To maintain the belt tight pendant links $w$ are connected to the floor as shown by an adjustable spring $w^1$. By employing the belt drive shown the extended arms $d^1$, $e^1$ and the springs may be dispensed with in some cases.

For disconnecting the driving pulley $h$ from the frictionally driven disk $g^1$ the base plate $a$ may be canted against the pulling over action of the spring $d^2$ or its modifications as shown in Fig. 10 by rotating a screw threaded spindle 1, Fig. 10ᵃ, thus moving a crosshead nut 2 which when depressed may engage with a bracket on the base plate $a$ thus depressing and canting the base plate over against the action of say the compressed spring $e^3$ or the tension spring $d^3$ Fig. 10ᶜ. The crosshead nut 2 may in some cases as shown be connected by links 3 with a freely moving crosshead 4 on which rests the lower end of a spring $e^3$ that tends to press the wheel $h$ on to the wheel $g^1$.

When the screwed spindle 1 is rotated in a direction to allow the base plate $a$ to cant over and engage the friction gearing the compression on the spring $e^3$ may be increased according to requirements. The end of the screwed spindle 1 may be anchored to one of the floor stands $b^2$ as shown. In no case can the frictional driving pressure between the disks be increased by the crosshead nut 2 excepting by compressing the holding up spring $e^3$ thus always allowing for a resilient pressure being exerted.

What I claim is:—

1. In variable speed friction gearing, a driving wheel, a disk adapted to be frictionally driven by said wheel, a shaft on which said wheel is fixed, means for rotating said shaft, a rocking base carrying said shaft, means carried by said base for moving said wheel along its shaft to alter the position at which it engages said disk, and yielding means adapted to rock said base in a direction to cause said wheel to bear on said disk.

2. In variable speed friction gearing, a driving wheel, a disk adapted to be frictionally driven by said wheel, a shaft on which said wheel is fixed, means for rotating said shaft, a rocking base, bearings on said base, a pivot shaft freely mounted in said bearings, adjustable bearings supporting said pivot shaft, means carried by said base for moving said wheel along its shaft to alter the position at which it engages said disk, and yielding means adapted to rock said base in a direction to cause said wheel to bear on said disk.

3. In variable speed friction gearing, a driving wheel, a disk adapted to be frictionally driven by said wheel, a shaft on which said wheel is fixed, means for rotating said shaft, a rocking base, bearings on said base, a pivot shaft freely mounted in said bearings, a traversing arm engaging said wheel and mounted to slide on said pivot shaft, and yielding means adapted to rock said base in a direction to cause said wheel to bear on said disk.

4. In variable speed friction gearing, a driving wheel, a disk adapted to be frictionally driven by said wheel, a shaft on which said wheel is fixed, means for rotating said shaft, a rocking base carrying said shaft, gearing carried by said base for moving said wheel along its shaft to alter the position at which it engages said disk, means adapted to automatically render said gearing inoperative when the said wheel has been moved to a predetermined extent, and yielding means adapted to rock said base in a direction to cause said wheel to bear on said disk.

5. In variable speed friction gearing, a driving wheel, a disk adapted to be frictionally driven by said wheel, a shaft on which said wheel is fixed, means for rotating said shaft, a rocking base carrying said shaft, gearing including a ratchet and pawl for moving said wheel along its shaft to alter the position at which it engages said disk, and yielding means adapted to rock said base in the direction to cause said wheel to bear on said disk.

6. In variable speed friction gearing, a driving wheel, a disk adapted to be frictionally driven by said wheel, a shaft on which said wheel is fixed, a belt pulley on said shaft, a rocking base carrying said shaft, means carried by said base for moving said wheel along its shaft to alter the position at which it engages said disk, and yielding means adapted to rock said base in a direction to cause said wheel to bear on said disk.

7. In variable speed friction gearing, a driving wheel, a disk adapted to be frictionally driven by said wheel, a shaft on which said wheel is fixed, a belt pulley on said shaft, a driving belt on said pulley, a movable guide pulley over which said belt is led, means for moving said guide pulley in a direction to pull on said belt, a rocking base, carrying said shaft, means carried by said base for moving said wheel along its shaft to alter the position at which it engages said disk, and yielding means adapted to rock said base in a direction to cause said wheel to bear on said disk.

8. In variable speed friction gearing, a base plate, bearings on said base plate, a longitudinal pivot shaft on which said bearings are freely mounted, adjustable bearings supporting said pivot shaft, a driving shaft, bearings on said base plate in which said driving shaft is arranged to rotate, springs tending to turn said base plate about said pivot shaft, a rotary driven disk, a driving wheel mounted to slide on and rotate with said driving shaft, an arm engaging said wheel and mounted to slide on said pivot shaft, a screwed spindle fixed to said arm, a nut mounted to rotate but not more endwise in one of said bearings on said base plate in which said driving shaft rotates, and means for rotating said nut.

9. In variable speed friction gearing, a base plate, bearings on said base plate, a longitudinal pivot shaft on which said bearings are freely mounted, adjustable bearings supporting said pivot shaft, a driving shaft, bearings on said base plate in which said driving shaft is arranged to rotate, springs tending to turn said base plate about said pivot shaft, a rotary driven disk, a driving wheel mounted to slide on and rotate with said driving shaft, an arm engaging said wheel and mounted to slide on said pivot shaft, a screwed spindle fixed to said arm, a nut mounted to rotate but not move endwise in one of said bearings on said base plate in which said driving shaft rotates, a worm wheel on said nut, a worm gearing into said worm wheel, a worm shaft on which said worm is fixed, a ratchet wheel on said worm shaft, a pawl engaging said ratchet wheel, and a rocking arm to which said pawl is pivoted.

10. In variable speed friction gearing, a base plate, bearings on said base plate, a longitudinal pivot shaft on which said bearings are freely mounted, adjustable bearings supporting said pivot shaft, a driving shaft, bearings on said base plate in which said driving shaft is arranged to rotate, adjustable springs tending to turn said base plate about said pivot shaft, a rotary driven disk, a driving wheel mounted to slide on and rotate with said driving shaft, an arm engaging said wheel and mounted to slide on said pivot shaft, a screwed spindle fixed to said arm, a nut mounted to rotate but not move endwise in one of said bearings on said base plate in which said driving shaft rotates, and means for rotating said nut.

11. In variable speed friction gearing, a base plate, bearings on said base plate, a longitudinal pivot shaft on which said bearings are freely mounted, adjustable bearings supporting said pivot shaft, a driving shaft, bearings on said base plate in which said driving shaft is arranged to rotate, springs tending to turn said base plate about said pivot shaft, a rotary driven disk, a driving wheel mounted to slide on and rotate with said driving shaft, an arm having a lug and engaging said wheel and mounted to slide on said pivot shaft, a screwed spindle fixed to said arm, a nut mounted to rotate but not move endwise in one of said bearings on said base plate in which said driving shaft rotates, a hand wheel fixed to said nut, a worm wheel on said nut, a worm gearing into said worm wheel, a worm shaft on which said worm is fixed, means for rotating said worm shaft, a rocking bearing in which one end of said worm shaft is mounted, a link freely mounted on said worm shaft, a link pivoted to said base plate, a pivot pin connecting both said links, a rod pivoted to said pin and extending through the lug of said sliding arm, abutments on said rod, springs on said rod between said abutments and said lug, a catch adapted to prevent movement of said links, and means operated by said sliding arm adapted to release said catch.

12. In variable speed friction gearing, a base plate, bearings on said base plate, a longitudinal pivot shaft on which said bearings are freely mounted, adjustable bearings supporting said pivot shaft, a driving shaft, bearings on said base plate in which said driving shaft is arranged to rotate, springs tending to turn said base plate about said pivot shaft, a rotary driven disk, a driving wheel mounted to slide on and rotate with said driving shaft, an arm having a lug and engaging said wheel and mounted to slide on said pivot shaft, a screwed spindle fixed to said arm, a nut mounted to rotate but not move endwise in one of said bearings on said base plate in which said driving shaft rotates, a hand wheel fixed to said nut, a worm wheel on said nut, a worm gearing into said worm wheel, a worm shaft on which said worm is fixed, means for rotating said worm shaft, a rocking bearing in which one end of said worm shaft is mounted, a link freely mounted on said worm shaft, a link pivoted to said base plate, a pivot pin connecting both said links, a rod pivoted to said pin and extending through the lug of said sliding arm, abutments on said rod, springs on said rod between the said abutments and the lug of said sliding arm, a catch adapted to prevent movement of said links, a releasing rod connected to said catch and sliding in the lug of said sliding arm, abutments on said releasing rod, and springs between the lug of said sliding arm and said releasing rod abutments.

13. In variable speed friction gearing, a base plate, bearings on said base plate, a longitudinal pivot shaft on which said bearings are freely mounted, adjustable bearings supporting said pivot shaft, a driving shaft, bearings on said base plate in which said driving shaft is arranged to rotate, springs tending to turn said base plate about said pivot shaft, a rotary driven disk, a driving wheel mounted to slide on and rotate with said driving shaft, an arm having a lug and engaging said wheel and mounted to slide on said pivot shaft, a screwed spindle fixed to said arm, a nut mounted to rotate but not move endwise in one of said bearings on said base plate in which said driving shaft rotates, a hand wheel fixed to said nut, a worm wheel on said nut, a worm gearing into said worm wheel, a worm shaft on which said worm is fixed, means for rotating said worm shaft, a rocking bearing in which one end of said worm shaft is mounted, a link freely mounted on said worm shaft, a link pivoted to said base plate, a pivot pin connecting both said links, a rod pivoted to said pin and extending through the lug of said sliding arm, abutments on said rod, springs on said rod between said abutments and said lug of said sliding arm, an extension formed with two recesses on said link pivoted to said base plate, a catch plate pivoted to said base plate and adapted to engage the recesses of said extension, a releasing rod connected to said catch and sliding in the lug of said sliding arm, abutments on said releasing rod, and springs between the lug of said sliding arm and said releasing rod abutments.

Signed at the American consulate, Tower Buildings, Liverpool, this fourteenth day of May, 1913.

JOSEPH ARTHUR WADE.

Witnesses:
F. M. C. SCOTT,
WM. FORCE STEAD.

---

Copies of this patent may be obtained for five cents each, by addressing the "Commissioner of Patents, Washington, D. C."